United States Patent [19]

Ehmig et al.

[11] 4,136,854
[45] Jan. 30, 1979

[54] ALL-METAL LIFT VALVE FOR HIGH-VACUUM APPLICATIONS

[75] Inventors: Gerhard Ehmig, Feldkirch-Tosters, Austria; Karl Vogt, Buchs, Switzerland

[73] Assignee: Vat Aktiengesellschaft fur Vakuum-Apparate-Technik, Haag, Switzerland

[21] Appl. No.: 698,338

[22] Filed: Jun. 22, 1976

[30] Foreign Application Priority Data

Jul. 1, 1975 [CH] Switzerland ............... 8557/75

[51] Int. Cl.² ............... F16K 1/38; F16K 1/42; F16K 51/02
[52] U.S. Cl. .................. 251/333; 251/361; 251/368
[58] Field of Search ............ 251/334, 333, 361, 368

[56] References Cited

U.S. PATENT DOCUMENTS

| 193,087 | 7/1877 | Holly | 251/361 |
| 877,865 | 1/1908 | Ricksecker, Jr. | 251/334 |
| 1,589,241 | 6/1926 | Scott | 251/333 X |
| 2,192,339 | 3/1940 | Wilson | 251/334 |
| 2,330,881 | 10/1943 | Gora | 251/334 |
| 2,645,449 | 7/1953 | Gulick | 251/334 |
| 3,043,323 | 7/1962 | Market et al. | 251/333 X |
| 3,550,903 | 12/1970 | Hauser | 251/334 X |
| 3,620,251 | 11/1971 | Bowen | 251/333 X |

FOREIGN PATENT DOCUMENTS 198785 10/1938 Switzerland ............... 251/333

Primary Examiner—Arnold Rosenthal
Attorney, Agent, or Firm—Hans Berman

[57] ABSTRACT

A metallic valve member having an annular, tapering sealing face makes practically line contact along a circle with a valve seat whose frustoconical inner portion is a sheet metal element having a rounded edge directed substantially at right angles toward the sealing face. An axial closing force applied to the valve member produces a much higher sealing force holding the edge of the seat engaged with the sealing face of the valve member.

8 Claims, 4 Drawing Figures

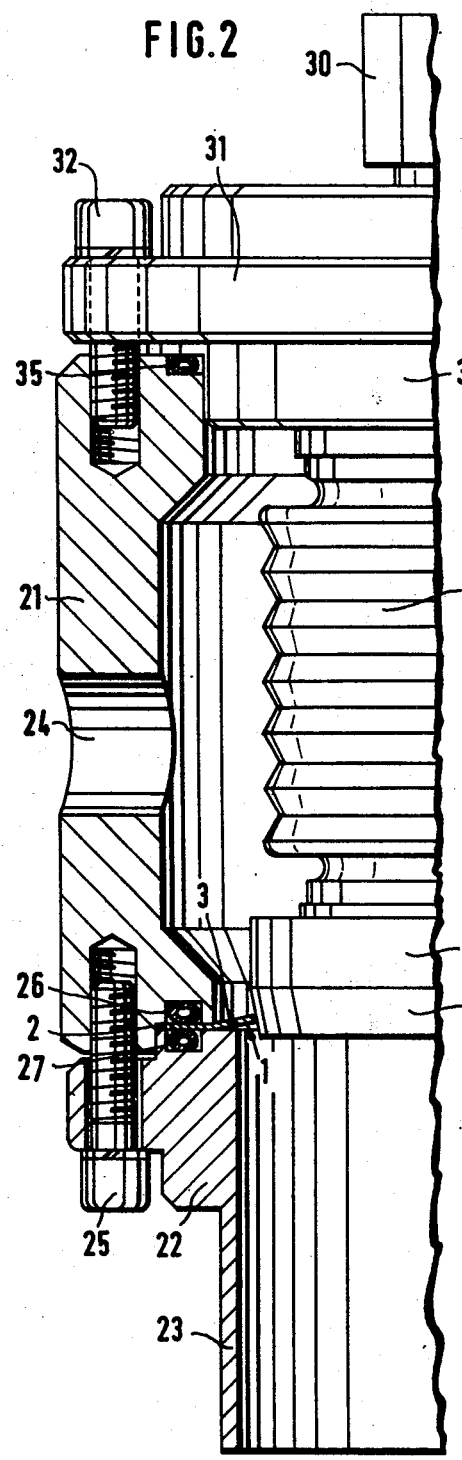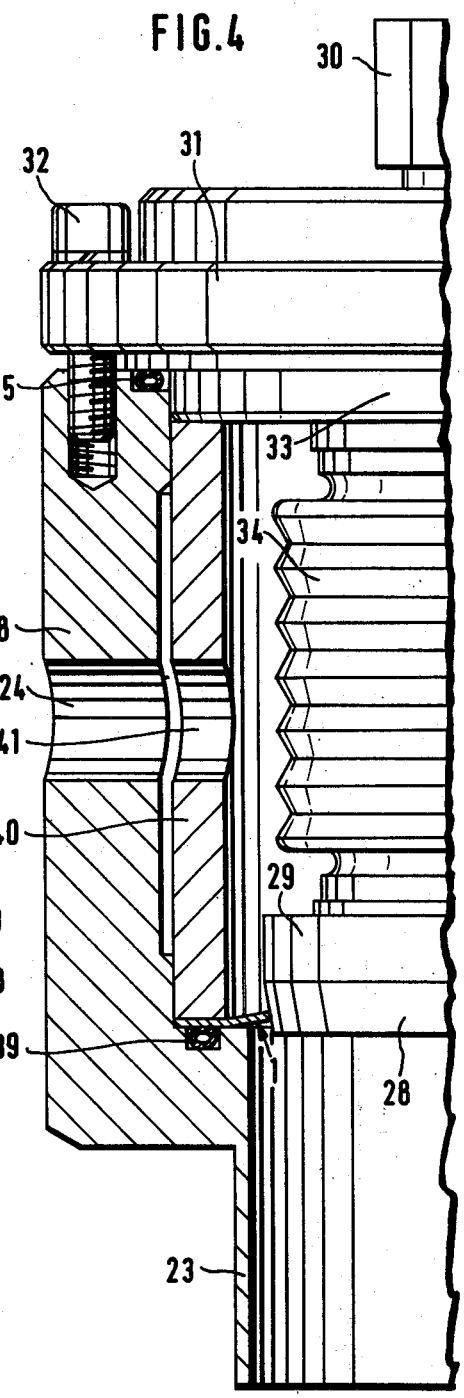

ALL-METAL LIFT VALVE FOR HIGH-VACUUM APPLICATIONS

This invention relates to all-metal valves, and particularly to a lift valve suitable for high-vacuum applications in which a valve element having a circular edge engages an annular sealing face of another valve element in the closing position of the valve.

In known all-metal valves of the type described, the two valve elements are made of metal differing greatly in hardness. When the valve is being closed, the softer metal is plastically deformed by engagement with the harder metal to achieve a tight seal. Deformation of the softer element is repeated at each closing operation and requires gradually increasing force, partly because of cold-working of the deformed metal and partly because of the inevitable enlargement of the contact surfaces. The useful life of such a valve is limited by the closing force required for making a tight seal, such force ultimately being either not available or too great to be absorbed by the valve structure. Known valves of the type described can generally not be opened and closed tightly more than 100 times, and 500 opening and closing cycles are available only under exceptional conditions if leakage through the closed valve must not exceed $10^{-6}$ torr liter per second as determined with helium in the manner conventional in testing high-vacuum equipment.

The known all-metal high-vacuum valves are also sensitive to temperature changes when closed. Displacement of the engaged valve elements under thermal stresses may damage the contact face of the softer metal, and such thermal stresses are inherent in the different nature of the metals constituting the two elements respectively.

It is the primary object of this invention to provide an all-metal valve for high-vacuum applications which is free of the shortcomings of the known devices.

More specifically, the invention aims at providing a valve which permits a tight seal to be formed in a much larger number of opening and closing cycles than available heretofore without requiring an increase in the closing force to achieve adequate tightness. Another object is the provision of a valve which is not affected by thermal stresses.

At the core of this invention is the finding that plastic deformation of valve elements during valve closing must be avoided. A tight seal without such deformation has been found to be available when the two engageable sealing elements of the valve, that is, the stationary valve seat and the movable valve member, are both made of materials which are incapable of significant plastic deformation under the applied closing force, and when the applied closing force produces a high closing or contact force applied practically at right angles to the sealing face of the movable valve member by the valve seat along a circle.

In its more specific aspects, the valve of the invention has a housing defining a flow path. A metallic valve seat member and a metallic valve member are arranged in the housing. One of the members has an annular edge portion, and the other member has an annular sealing face. Valve actuating means move the valve member in a predetermined direction toward and away from a position of sealing engagement of the edge portion with the sealing face in substantially linear contact along a circle. The direction of valve member movement is obliquely inclined at an angle of less than 30° to all portions of the sealing surface in respective planes perpendicular to the circle of contact. When in their position of sealing engagement, the two members close the aforementioned flow path.

Other features, additional objects, and many of the attendant advantages of this invention will readily be appreciated as the same becomes better understood by reference to the following detailed description of preferred embodiments when considered in connection with the appended drawing in which:

FIG. 2 shows one half of another valve of the invention in elevational section, the non-illustrated half being a mirror image of the illustrated structure;

FIG. 4 illustrates yet another high-vacuum valve of the invention in a view corresponding to that of FIG. 2.

Figure 1:
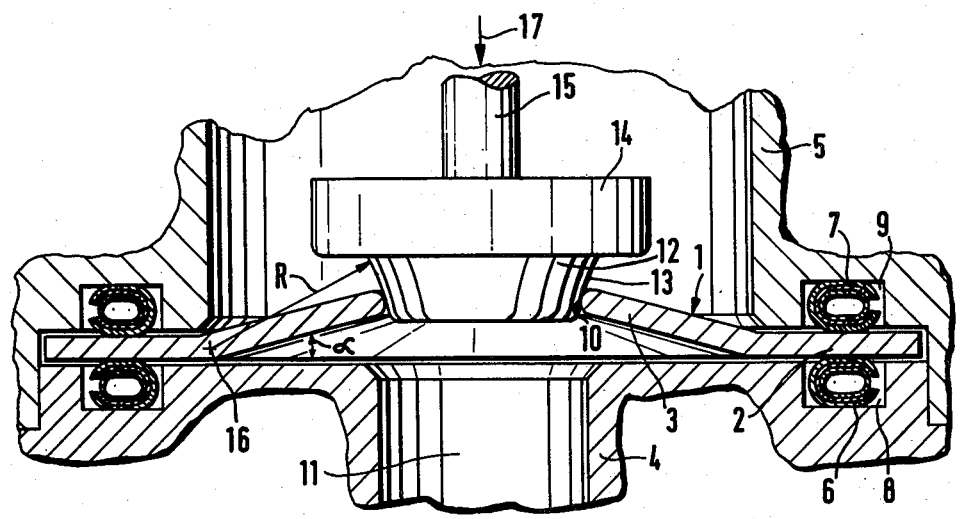
FIG. 1 shows a high-vacuum valve of the invention in fragmentary, elevational section.

Referring now to the drawing in detail, and initially to FIG. 1, there is shown only as much of a valve of the invention as is needed for an understanding thereof, the non-illustrated part of the valve being analogous to the showing of FIGS. 2 or 4.

The stationary seal 1 of the valve is an annular, circular disc of hard, but resilient sheet metal. Its outer, peripheral portion 2 is planar, and its inner portion 3 is frustoconical. The outer disc portion 2 is clampingly received between two parts 4, 5 of the valve housing, a tight connection between the housing parts being provided by resilient sealing rings 6, 7 on opposite sides of the disc portion 2 in respective circular grooves 8, 9 of the housing parts 4, 5.

In the illustrated closed valve position, the conical disc portion 3 constitutes a sealing lip whose rounded edge portion 10 makes practically line contact along a circle with a movable valve member 12 to close a flow path 11 through the housing 4, 5. The very rigid valve member 12 has a sealing face 13 which is concavely toroidal about an axis passing through the center of the contact circle in the plane of FIG. 1. The valve member 12 is fixedly fastened to a carrier 14 attached to a valve actuating stem 15. The direction of valve movement into the illustrated closing position is indicated by an arrow 17, is parallel to the principal axis of the toroidal sealing face 13 and obliquely inclined to the face 13 at the point of contact with the edge portion 10 at an angle of less than 30° in the plane of FIG. 1 and in all other planes through the axis of the face 13.

The two portions 2, 3 of the valve seat 1 merge along a circular line 16 centered in the toroid axis. The sealing face 13 is circularly arcuate and concave in the view of FIG. 1 and has a radius of curvature R, the center of curvature being located in the circular line 16. Because of this dimensional arrangement, the edge portion 10 is directed perpendicularly against the sealing face 13, and the acute angle $\alpha$ defined by the two portions 2, 3 of the valve seal 1 is equal to the angle at which the sealing face 13 is inclined to the axis of the face 13 in the circle of contact.

The contour of the edge 10 in the plane of FIG. 1 and in all other planes through the axis of the contact face 13 is a semi-circle whose axis of curvature is located on a straight line connecting the circular line 16 with the circle of contact between the valve elements 1, 12, and representing a median surface between the opposite major faces of the valve seat portion 3.

Tightness of the valve in the closed position is predicated on engagement of the edge portion 10 with the surface 13 in a closed loop. If it were possible to machine or otherwise shape the valve seat 1 and the valve member 12 with absolute precision, this would be achieved without difficulty. While such precision is not attainable, it is not required. The relatively resilient edge portion 10 of the valve seat 1 resiliently yields to the closing pressure applied as indicated by the arrow 17 and multiplied by the wedge effect of the inclined sealing face 13. Microscopic roughness of the engaged sealing elements is also compensated by elastic deformation of the edge portion 10 and of the sealing face 13.

No plastic deformation is possible when the materials of the engageable valve elements are suitably chosen. Preferred metals for the valve seat 1 are hard titanium alloys, steel alloyed with much nickel and rolled to high hardness, or high-carbon spring steel. The valve member 12, whose minimum dimension between exposed surfaces is much greater than the practically uniform thickness of the valve seat 1, is prefarably made from Stellite, hard phosphor bronze, silicon bronze, or certain alloy steels which are as hard as glass.

All valves of the invention have been found capable of several thousand opening-and-closing cycles without need for an increased closing force to maintain a tightness corresponding to a helium leakage of not more than $10^{-9}$ torr liter per second. The closing force applied to the stem 15 is 1/3 or even only 1/10 of the force with which the edge portion 10 is held in sealing engagement with the face 13 with suitable choice of the angle $\alpha$ which, in the embodiments illustrated, is in the generally preferred range of 10° to 20°.

It has been found that the conical or lip portion 3 of the valve seat 1 is displaced in a downward direction, as viewed in FIG. 1, when the valve member 12 is moved in the direction of the arrow 17 while engaging the edge portion 10. Such displacement is accompanied by a small rolling motion of the edge portion 10 on the concavely toroidal face 13, but there is no relative sliding movement. The same rolling motion occurs during temperature changes and corresponding dimensional changes of the valve elements. There is no frictional nor other significant wear of the engaged surfaces.

For obvious reasons, the most desirable geometrical relationships of the engaged valve elements cannot always be established or maintained in actual practice, but they are approached closely without difficulty to achieve most of the beneficial results of this invention. The tightness of the closed valve and its long useful life are not significantly impaired if contact is made between the two valve elements in an area so narrow as to provide virtually linear contact. Slight deviations are permissible from a rectangular relationship between the straight line connecting the circular line 16 with the circle of contact between the valve elements in planes such as that of FIG. 1. Similarly, the center of curvature of the face 13 in the plane of FIG. 1 need only be contiguously adjacent the straight line through the circular line 16 and the circle of contact.

Figure 3:
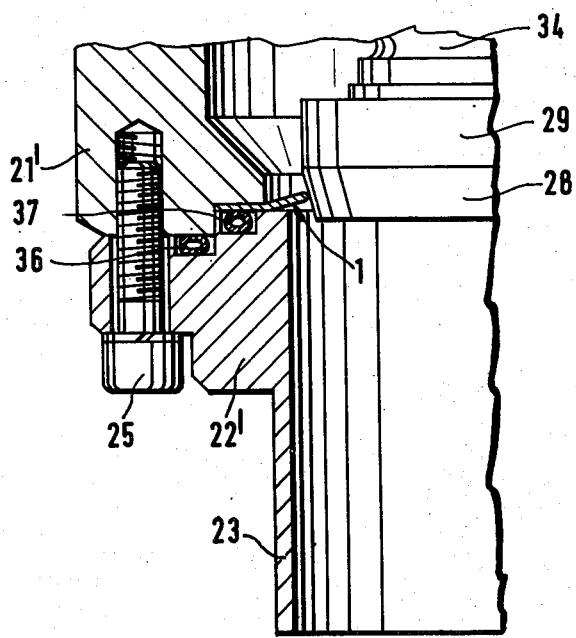
FIG. 3 shows a modification of a portion of the valve of FIG. 2.

More substantial modifications of the apparatus illustrated in FIG. 1 are possible without at all impairing the operation of the valve. Thus, the toroidal sealing face may be replaced by a sealing face which is convexly circular in the section of FIG. 1 so that the valve member assumes the shape of a segment of a sphere whose center of curvature is located on the line connecting the circular line 16 with the center of curvature of the edge portion 10. Such a spherically arcuate sealing face is a surface of rotation as is the toroidal face 13 shown in FIG. 1 and tapers in the direction indicated in FIG. 1 by the arrow 17 as does the toroidal face 13. A spherical valve member has the advantage of being self-centering, but it is more difficult to machine with the necessary precision than the toroidally shaped valve member 12. It is simpler to produce a conical sealing face to exacting specifications even on very hard metals as by grinding, the valves of the invention having conically arcuate sealing faces are shown in FIGS. 2 to 4.

The valve illustrated in FIG. 2 has a housing whose body is constituted by two axial parts 21, 22 of generally circular cross section about a common axis. The housing part 22 is integral with a nipple 23 suitable for direct sealing to a non-illustrated vacuum pump. A radial bore 24 in the housing portion 21 may be connected to non-illustrated apparatus that it is desired to evacuate. The two parts of the housing body are connected by flanges and bolts 25 of which only one is seen in FIG. 2. Sealing rings 26, 27 are recessed in the juxtaposed radial faces of the housing parts 21, 22 respectively, and the planar portion 2 of the valve seat 1, identical with the corresponding element described with reference to FIG. 1, is clamped between the sealing rings 26, 27 under the pressure of the bolts 25.

The sealing face 28 of the movable valve member 29 is frustoconical and is moved toward and away from the illustrated closing position by an actuating spindle 30 rotatably attached to the valve member 29 in a conventional manner, not shown, and threadedly received in a bore of a cover 31 flangedly attached to the housing body portion 21 by circumferentially distributed bolts 32. A reduced part 33 of the cover 31 projects into the cavity of the housing body and is movably sealed to the valve member 29 by metal bellows 34. A tight seal between the cover 31 and the housing body part 21 is ensured by a resilient ring 35 partly recessed in the housing part 21.

The spatial relationships of the sealing face 28 and of the valve seat 1, more specifically the conical inner portion 3 of the valve seat, are closely analogous to those described with reference to corresponding elements shown in FIG. 1. The angle of inclination of the sealing face 28 relative to the valve axis is selected in such a manner that the free edge of the seat 1 bounding the central opening in the valve seat is pressed approximately perpendicularly against the sealing face 28 when the spindle 30 is tightened. The valve illustrated in FIG. 2 shares the features and advantages of the embodiment of the invention shown in FIG. 1.

The valve partly illustrated in FIG. 3 is identical with that described with reference to FIG. 2 except for the seal between the housing body parts 21', 22' and the valve seal 1. The juxtaposed radial faces of the body parts are stepped. A sealing ring 36 is directly interposed between the peripheral face portions of the two body parts, and the valve seat 1 is clamped between the central face portion of the body part 21' and a sealing ring 37 recessed in the body part 22'.

The valve shown in FIG. 4 differs from that described above with reference to FIG. 2 by a unitary housing body 38 integral with the nipple 23 and formed with the bore 24. The valve seat 1 is clamped between a sealing ring 39 recessed in a shoulder of the housing body 38 and a coaxial, cylindrical sleeve axially backed by the cover 31 under the clamping pressure of the bolts 35. A radial bore 41 in the sleeve 40 is aligned with the bore 24 in the housing body 38.

The manner in which the valve seat 1 is attached to the valve housing does not affect cooperation of the valve seat with a movable valve member, and the mode of operation of the modified valves is as described above with reference to FIG. 1.

It is generally preferred that the sheet metal element 1 constitute the stationary element of the valve, and that the movable element be the valve member received in the opening of the valve seat in the sealing position of the valve, but the advantages of this invention are obtained with a valve in which this relationship is reversed. Other permutations and variations in the illustrated valves will readily suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the appended claims.

What is claimed is:

1. A valve comprising:
   (a) a housing defining a flow path therethrough;
   (b) a valve seat member fixedly mounted in said housing and formed with an opening therethrough;
   (c) a valve member of metallic material,
      (1) said valve seat member being an annular disc of sheet metal having two opposite major faces and an annular edge portion of rounded contour connecting said major faces,
      (2) said disc consisting essentially of an outer planar portion and an inner frustoconical portion terminating in said edge portion,
      (3) said valve member having an annular sealing surface; and
   (d) actuating means for moving said valve member relative to said valve seat member in a predetermined direction toward and away from a position in which said valve member closes said opening,
      (1) said edge portion in said position engaging said surface substantially in line contact along a circle,
      (2) said predetermined direction being obliquely inclined relative to said surface at an angle of less than 30° in all planes perpendicular to said circle,
      (3) said two major faces defining a median line between said faces in each of said planes,
      (4) each median line being substantially perpendicular to the engaged sealing surface in the corresponding plane,
      (5) said sealing surface being a surface of rotation about an axis extending through the center of said circle in said predetermined direction, said surface tapering in the direction of movement of said valve member toward said position,
      (6) said actuating means including means for applying to said edge portion and to said surface a contact pressure effective to maintain a tightness therebetween corresponding to a helium leakage of not more than $10^{-9}$ torr liter per second,
      (7) said metallic materials resisting plastic deformation under the applied pressure.

2. A valve as set forth in claim 1, wherein said contour is semi-circular, said portions of said valve seat member being of equal thickness smaller than the smallest dimension of said valve member between exposed surfaces of said valve member.

3. A valve as set forth in claim 1, wherein said sealing surface is circularly arcuate in each of said planes.

4. A valve as set forth in claim 3, wherein said outer planar portion and said inner frustoconical portion merge along a circular line, the center of curvature of said sealing surface in each of said planes being contiguously adjacent a straight line through said circular line and said circle.

5. A valve as set forth in claim 1, wherein said sealing surface is conical.

6. A valve as set forth in claim 5, wherein said inner portion defines a conical surface intersecting said sealing surface at substantially right angles in each of said planes.

7. A valve as set forth in claim 1, further comprising sealing means sealing said outer portion to said housing.

8. A valve as set forth in claim 7, wherein said housing has a body portion and a cover portion, said sealing means including a sleeve member interposed between said portions of the housing, said outer portion being received between said sleeve member and one of the portions of said housing.

* * * * *